April 3, 1962        I. P. FILDERMAN        3,027,803
SPECTACLE LENS-CONTACT LENS SYSTEM
Filed June 29, 1959
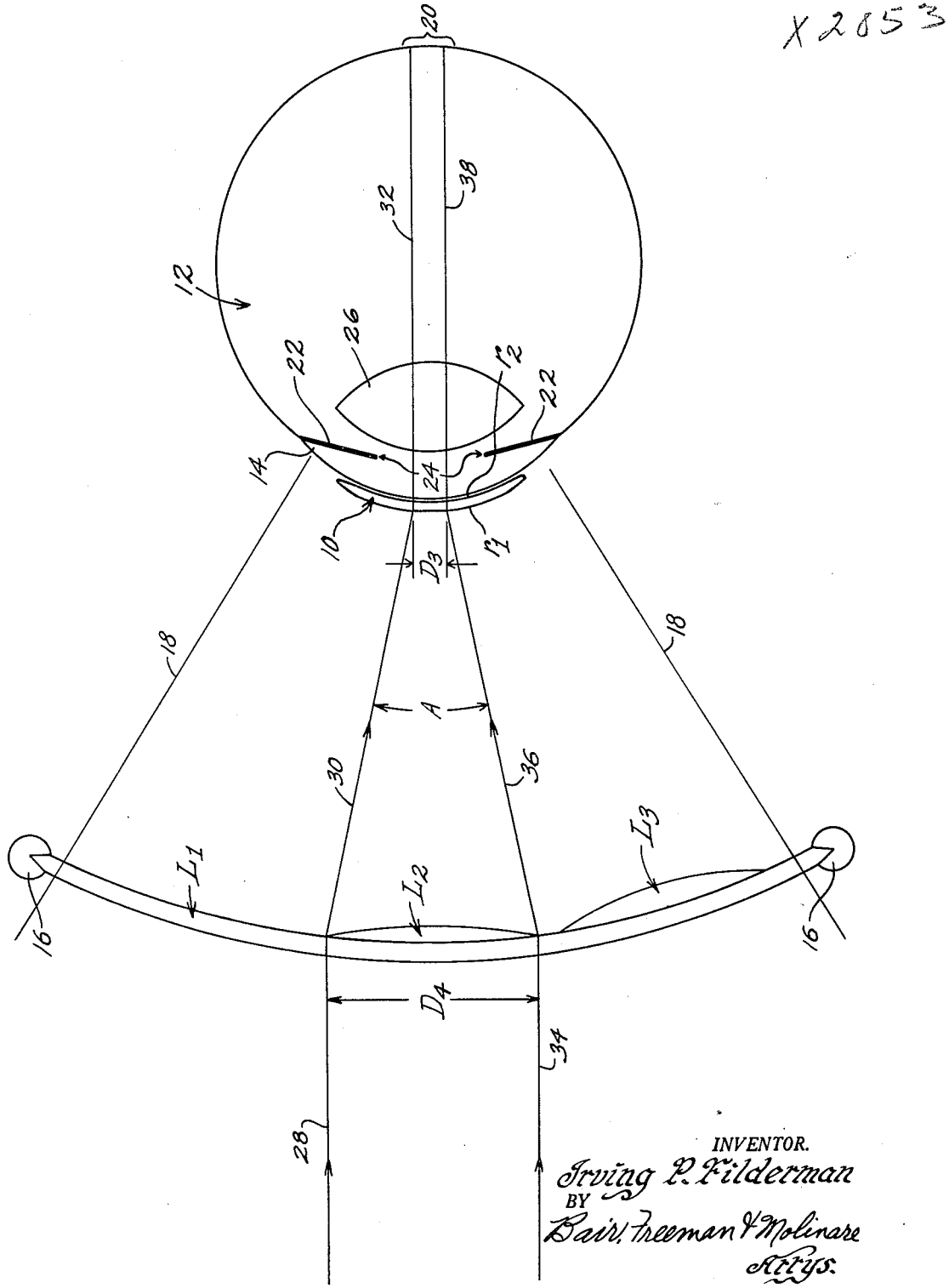
INVENTOR.
Irving P. Filderman
BY
Bair, Freeman & Molinare
Attys.

United States Patent Office 3,027,803
Patented Apr. 3, 1962

3,027,803
SPECTACLE LENS-CONTACT LENS SYSTEM
Irving P. Filderman, Memphis, Tenn., assignor to National Eye Research Foundation, a not-for-profit corporation of Illinois
Filed June 29, 1959, Ser. No. 823,698
2 Claims. (Cl. 88—54.5)

This invention relates to a telescopic lens system consisting of a contact lens as an eyepiece and a spectacle lens as an objective, the eyepiece being a negative lens and the system therefore being a modified Galilean telescope.

One object of the invention is to provide a lens system which alleviates most of the disadvantages of other subnormal vision aids and facilitates the full time wearing of a magnification device by partially sighted individuals, offering tremendous improvements in central acuity while overcoming two major problems encountered in prior telescopic systems, namely field restriction and a fast-moving field due to the magnification effected by the system.

Another object is to provide a system that uses either a scleral type or corneal type contact lens in combination with a spectacle lens to achieve the magnification necessary for improved acuity, high minus dioptric power being used in the contact lens located in a small central area thereof which is intentionally made smaller than the pupil diameter measured in usual daylight illumination, the area of the contact lens surrounding this high minus optical portion containing the dioptric power necessary to correct the patient's eye to emmetropic state, or with some magnification or minification if desired.

Still another object is to provide:

(1) the objective or spectacle lens of the combination with plano power throughout the periphery thereof, and the periphery of the contact lens with the power required to make the patient in effect emmetropic (plano power if he is already emmetropic), or with magnification or minification as above mentioned, the center of the lens containing the plus power necessary to achieve the desired magnification of my spectacle lens-contact lens system; or (2) part of the required peripheral prescription in the contact lens and part in the spectacle lens in any desired proportions; or (3) all of the required peripheral prescription in the spectacle lens.

A further object is to provide such a system which can also be adapted for bifocal use, the spectacle lens containing the additional plus power therefor in the ordinary bifocal position to achieve adequate near point acuity.

Still a further object is to provide the central portion of the contact lens which forms the eyepiece for the telescopic lens system significantly smaller than the patient's pupil diameter with the remaining regular contact lens correcting the peripheral area for normal "walkaround" vision through it and through the peripheral portion of the spectacle lens.

An additional object is to provide a telescopic lens system which eliminates the tunnel vision effect of previous telescopic spectacle devices since the entire contact lens and spectacle lens, involving both the telescopic elements and the normal vision elements, are completely transparent and not enclosed by tubes or other devices that obstruct the field of view, a mere 2½ to 3 mm. diameter of the central portion of the contact lens being used in my telescopic system.

Another additional object is to provide a telescopic lens system of the kind herein disclosed which can readily achieve magnification of 2× and with some modification can even achieve greater magnification which is sometimes desirable for patients who have subnormal vision, the use of a contact lens as one lens of the telescopic system, due to its proximity to the cornea, making it unnecessary to achieve as high magnification as required in tube type telescopic spectacle systems.

With these and other objects in view, my invention consists in the construction, arrangement and combination of the various parts of my spectacle lens-contact lens system, whereby the objects above contemplated are attained, as hereinafter more fully set forth, pointed out in my claims and illustrated in detail on the accompanying drawing, wherein:

The FIGURE is a diagram, approximately to scale and enlarged five times, of an eyeball, a contact lens and a spectacle lens as they are related in my spectacle lens-contact lens system, a corneal contact type of lens being illustrated.

Before describing the design of the system, it would be well to review some of the basic optics involved in the telescopic system.

In principle, the usual telescope consists of two lenses mounted in a tube, an objective and an eyepiece (or ocular). The objective is a positive lens which forms a real inverted image of the distant object. This image is observed through a second lens called the eyepiece. In the case of a Galilean telescope, this eyepiece is a negative lens. The negative eyepiece will form an erect image of the real inverted image produced by the objective. If it be assumed that the objective is the aperture stop, it will be seen that the exit pupil, which is then the image of the objective formed by the ocular, is within the instrument at approximately the second focal point of the ocular.

In my spectacle lens-contact lens system, a contact lens 10 which may be of either the corneal or scleral type is provided. The lens 10 as shown has the proper base curve $r_2$ required for comfort on the cornea 14 of a given eye 12 and with an anterior radius $r_1$ selected to give the best visual acuity with or without magnification or minification as desired. The iris of the eye 12 is shown at 22, defining the pupil 24 in front of the crystalline lens 26 of the eye.

The central portion of the contact lens 10 indicated $D_3$ is then reground plano, less convex than the radius $r_1$ or concave as desired to incorporate the necessary minus dioptric power to serve as a negative lens in the telescopic lens system as prescribed for a given patient. The diameter $D_3$ is significantly smaller than the patient's pupil diameter such as 2.5 mm. to 3 mm. as compared to the patient's pupil diameter in normal illumination (usually about 4 to 5 mm.). Thus the diameter $D_3$ forms the ocular of the telescopic system, whereas the remaining or peripheral portion of the contact lens outside the diameter $D_3$ is used as a regular contact lens, correcting for peripheral vision around the diameter $D_3$, and would be plano for an emmetropic condition, plus power for a hyperopic condition and minus power for a myopic condition (shown plano on the drawing).

The objective of the system is a spectacle lens $L_1$, shown of plano power, and this lens serves as a carrier for the objective lens, consisting of the portion $D_4$ of the spectacle lens $L_1$ and a central segment $L_2$ of positive power such as +25.00 diopters cemented to the lens $L_1$ over its diameter $D_4$. The base or inner (concave) curve of the lens $L_1$ may be on an average about 12.00 diopters and the diameter of $L_2$ is desirably about 10 mm. Instead of $L_1$ being cemented to $L_2$, the entire lens $L_1$–$L_2$ can be molded from glass or from plastic such as methyl methacrylate.

The lens $L_1$ is mounted in the usual spectacle frame 16 which is so adjusted that $L_2$ serves as the objective for the contact lens eyepiece $D_3$ by separating the two, for example 20 mm., thus obtaining a magnification of 2× if the lens portion $D_3$ is −50.00 diopters in power, and assuming that the patient is emmetropic. 20 mm. is a little more than the normal vertex distance between the eye and a spectacle lens.

The advantage of such a system lies in the fact that the patient has two optical systems, one a central system of about 25° (angle A) having a magnification of 2×, and the other a peripheral system having unit magnification and occupying all the peripheral field as to the limits indicated at 18 which involves, of course, some rotation of the eyeball in its socket. Since both fields are observed at the same time, the patient overcomes the problem of a fast-moving field of a telescopic system because one of the fields is not telescopic. As long as his visual axis, cone of central vision or line of regard passes through the lens $L_2$, he has a central telescopically magnified field superimposed on a broad normal field of vision. The telescopic field aids his subnormal vision and at the same time he is able to properly orient himself to surrounding objects because of the other field.

Other considerations in my system involve factors such as the field stop, and the degree which it can be varied. Exploring this area, it is possible to learn the optimum size for the cemented segment and its influence. The aperture stop and the field stop are identified and it is possible to explore some of the optics related to these variables as follows:

(1) Apperture stop—the stop that is most effective in limiting the axial bundle of rays 28—34 from the object. Obviously, the lens $D_3$ (or eyepiece) is the aperture stop. The entrance pupil 30—36 is the image of the aperture stop by the optical surfaces in front of the lens $D_3$. The exit pupil 32—38 is then the image of the aperture stop by the optical surfaces following the lens $D_3$.

(2) The chief ray passes through the center of the aperture stop. Obviously, the front len ($L_2$ in combination with the diameter $D_4$ of the lens $L_1$) is the field stop, regardless of its location, as long as the lens $D_3$ is the aperture stop. Therefore, the field of view is always set by the size of the objective more than by change of magnification.

The regular and basic clinical procedures for adapting a contact lens to a patient are followed as far as the lens 10 is concerned. It is especially desirable to accomplish an adaptation with the contact lens centered on the cornea.

Following are examples to determine the magnification desired in the central field.

*Example A.*—2× can be achieved as above in the case of an emmetrope. The power through the area $D_3$ would equal −50.00 diopters, while the distance between the contact lens and the spectacle lens would be 20 mm. The power through the $D_4$–$L_2$ lens would therefore be +25.00 diopters. If, for example, the individual were a 6.00 diopter hyperope, the total power through area $D_3$ would have to be −44.00 diopters. If the individual were a 6.00 diopter myope, the total power through $D_3$ would have to be −56.00 diopters.

*Example B.*—2.5× can be achieved in the case of an emmetrope if the power through area $D_4$ equals −60.00 diopters and the distance between the contact lens and the spectacle lens equals 25 mm. The power through $D_4$–$L_2$ would be +24.00 diopters.

The contact lens is ordered from the contact lens laboratory based on the specifications determined. The objective lens may be ordered as a segment centered in the plano spectacle lens, either cemented thereto or molded integrally therewith.

The lens $L_1$ may also be used in the normal way as a bifocal by ordering a second cemented segment $L_3$ having the proper reading addition as prescribed. This segment can be located at any desired place on the spectacle lens $L_1$. For instance, if a +8.00 reading addition is indicated, a separate cemented segment $L_3$ of +48.00 diopters in Example B would be ordered for placement below the central objective lens $D_4$–$L_2$. Obviously, instead of the addition of cemented segments, the entire lens $L_1$–$L_2$–$L_3$ may be molded if desired.

In the use of the lens system disclosed, when the patient's visual axis or line of regard is off the central lens $L_2$, he will retain relatively normal vision through the periphery of $L_1$ outside $D_4$ for "walk-around" purposes, and there will be a blurred central field due to the presence of the −50.00 diopter lens $D_3$. This is some disadvantage and may be overcome by using the lens system monocularly with those patients who have some useful vision in both eyes. They can thus direct their attention to the central image when magnification is needed, and for ordinary travel vision, use the central field of the other eye together with the peripheral field of both eyes. It is, however, also possible to use the lens system if there is effective vision in only one eye.

The cosmetic advantage of my system is sufficiently impressive to suggest many uses in selected cases. The optical advantages suggest a system which collimates more readily than heretofore possible, particularly because of the use of a negative lens in the system which is smaller in diameter than the normal size of the pupil of the eye, and the ability of the patient to project the magnified field to the normal plane of regard offers positive opportunities for the patient with limited vision. If corneal irregularities exist, they are optically eliminated by the application of the contact lens and thus extreme magnifications as required in telescopic spectacles may be unnecessary to provide adequate improvement in acuity. Cosmetic effect of the combination is not much worse than that offered by the spectacle worn by an aphakic patient.

In subnormal vision, usually it is central vision that is impaired as by damage to the fovea centralis represented at 20 on the drawing of the retina at the back of the eyeball. The rest of the retina involves peripheral vision as distinguished from central vision and in most cases it is not impaired and therefore does not require optical aid except for a myopic or hyperopic condition. In most cases, more magnification than is possible with contact lenses or spectacle lenses alone will improve central vision for clearly distinguishing detail at a distance which is impossible without telescopic aid and, of course, while peripheral vision is entirely satisfactory for normal travel and the like and consequent visual safety to the patient, he does require optical aid for his impaired central vision. By intentionally making the diameter of the high minus area $D_3$ of the contact lens smaller than the pupil diameter measured in usual daylight illumination, central vision is magnified telescopically while peripheral vision may remain as without lenses by plano peripheral portions of the lenses 10 and $L_1$, or may be corrected in either lens or by a combination of powers in the two lenses if prescription dictates the necessity for such correction.

While in my system great amounts of magnification such as 10× that one is able to secure in a telescopic spectacle lens is not practical, the contact lens of the combination reduces the distortional effects of the magnifying system to such an extent that it is seldom necessary to achieve that high a magnification. There is, of course, a practical limitation to the distance of the spectacle lens from the eye without detracting too much from the cosmetic appearance of the spectacle lens, or being too far in front of the eye to appear ridiculous.

By way of specifications and possible variations in the lenses 10 and $L_1$, the lens 10 may be any diameter with normal base and anterior curves, as well as peripheral curves and/or bevels as desired. The power of the lens may be either the spherical prescription of the patient, or plano or some power allowing peripheral magnification or minification.

The diameter $D_3$ may be 2½ to 3 mm. or anything smaller than the pupil in normal illumination and is high minus power such as, for example, −10.00 diopters or −100.00 diopters. The front surface may be convex, plano or concave as required in relation to the base curve. The lens $L_1$ may have any desired curvature, the posterior surface being 12.00 diopters on an average which, of course, may be increased or decreased as long as the anterior surface is properly related thereto. Such relation may result in plano power, or if the contact lens 10 in its periphery is plano or something other than the normal prescription, the power in the peripheral portion of the lens $L_1$ is then whatever is necessary to create the normal prescription or peripheral magnification or minification in respect thereto, as desired.

The segment $L_2$ of diameter $D_4$ would be on an average 10 mm., although this may be slightly increased or decreased if found desirable, and the segment $L_2$ may be cemented to the lens $L_1$ or the two may be integrally molded of glass or plastic. The segment $L_2$ may also be added to either the posterior or anterior surfaces of the lens $L_1$, or to both surfaces thereof as found desirable. Likewise the reading add lens $L_3$ may be cemented or molded in the desired position and would in most cases be a higher plus lens than the lens $L_2$ because of the desirability of focusing at closer range than through the spectacle lens-contact lens systems.

The central thickness of the contact lens 10 is desirably small as .1 mm, although it may be thicker if the peripheral portion of the lens 10 is of high plus power for a hyperope which, of course, requires a lens thicker at the center for a given diameter than when the lens is plano or negative in power. If the ocular $D_3$ requires as much as −100 diopters in power, the front surface must be concave.

In the use of my lens system the patient may find lack of clear central acuity when the eye is repositioned, so that the optical axis passes through the peripheral portion of the spectacle lens. This allows the high minus correction $D_3$ of the contact lens to be combined with the peripheral power of the spectacle lens. Therefore, the patient may be taught to selectively turn his head to retain telescopic vision or utilize eye movement beyond the range of the central optical portion of the spectacle lens to secure vision through $D_3$ and the peripheral power of the spectacle lens when that combination of optical powers can be advantageously used.

My lens system is primarily designed to aid central acuity. The patient utilizes his central vision for view through the telescopic system and simultaneously utilizes his peripheral vision for a view surrounding the telescopic system, provided the lens centers with both corrections in front of the pupil. Therefore, on looking through the peripheral portion of the spectacle lens, the patient also looks through the peripheral power of the contact lens providing improved vision surrounding the cone 30—36 as well as within it.

Some changes may be made in the construction and arrangement of the parts of my spectacle lens-contact lens system without departing from the real spirit and purpose of my invention, and it is my intention to cover by my claims any modified forms of structure or use of mechanical equivalents which may reasonably be included within their scope.

I claim as my invention:

1. In a spectacle lens-contact lens system, a spectacle lens having a central objective portion of plus power and a peripheral portion, a corneal contact lens of generally concavo-convex cross-section adapted to be retained on the cornea of the eye by capillary attraction produced by a lacrimal layer between the lens and the cornea, said corneal contact lens having a posterior surface curved to fit the cornea of a patient to which the lens is applied, having an ocular portion of high minus power and a peripheral portion, and having a maximum external dimension smaller than the limbus of the eye and greater than the pupil size under normal illumination, said objective portion of said spectacle lens being separated from said ocular portion of said corneal contact lens approximately the normal vertex distance for an eye and a spectacle lens and having a power related to the power of said ocular portion such that the two form a Galilean telescope, said ocular portion of said corneal contact lens defining the exit pupil of said telescope and the diameter of said ocular portion being 2.5 to 3 mm. whereby said telescope involves central vision simultaneously with said peripheral portions of said spectacle and contact lenses involving peripheral vision, said peripheral portions each having dioptic power such that the two of them in conjunction with each other substantially meet the prescription requirements for the peripheral vision of the wearer of the system.

2. The lens system of claim 1 wherein said spectacle lens has a reading add portion off center relative to said objective portion which is optically related to said objective portion which is optically related to and cooperates with said ocular portion of said corneal contact lens.

References Cited in the file of this patent

UNITED STATES PATENTS

| | | |
|---|---|---|
| 1,400,098 | Perrin | Dec. 13, 1921 |
| 2,164,801 | Dittmer | July 4, 1939 |
| 2,389,428 | Glasser | Nov. 20, 1945 |
| 2,642,776 | Boeder | June 23, 1953 |

OTHER REFERENCES

"Report on Survey of Optical Aids for Subnormal Vision," Ellerbrock, article in the "Journal of the Optical Society of America," vol. 36, No. 12, December 1946, pages 679–695; p. 683 especially cited.

"The Bifocal Contact Lens," article in "The Optician," vol. 135, No. 3498, April 18, 1958, p. 361 cited.